(12) United States Patent
Yen et al.

(10) Patent No.: US 9,011,717 B2
(45) Date of Patent: Apr. 21, 2015

(54) WHITE PHOSPHORS, METHODS OF MAKING WHITE PHOSPHORS, WHITE LIGHT EMITTING LEDS, METHODS OF MAKING WHITE LIGHT EMITTING LEDS, AND LIGHT BULB STRUCTURES

(75) Inventors: William M. Yen, Athens, GA (US); Zhiyi He, Guillin (CN); Sergei Basun, St. Petersburg (RU); Xiao-jun Wang, Statesboro, GA (US); Gennaro J. Gama, Athens, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 846 days.

(21) Appl. No.: 13/195,909

(22) Filed: Aug. 2, 2011

(65) Prior Publication Data
US 2011/0284798 A1    Nov. 24, 2011

Related U.S. Application Data

(62) Division of application No. 12/298,100, filed as application No. PCT/US2007/069320 on May 21, 2007, now Pat. No. 8,044,419.

(60) Provisional application No. 60/809,229, filed on May 30, 2006, provisional application No. 60/854,264, filed on Oct. 25, 2006.

(51) Int. Cl.
| | | |
|---|---|---|
| C09K 11/08 | (2006.01) | |
| C09D 5/22 | (2006.01) | |
| C09K 11/56 | (2006.01) | |
| C09K 11/57 | (2006.01) | |
| C09K 11/59 | (2006.01) | |
| C09K 11/66 | (2006.01) | |
| C09K 11/74 | (2006.01) | |
| C09K 11/77 | (2006.01) | |

(52) U.S. Cl.
CPC ............... *C09D 5/22* (2013.01); *C09K 11/565* (2013.01); *C09K 11/576* (2013.01); *C09K 11/592* (2013.01); *C09K 11/595* (2013.01); *C09K 11/665* (2013.01); *C09K 11/7421* (2013.01); *C09K 11/7701* (2013.01); *C09K 11/7731* (2013.01); *C09K 11/7787* (2013.01); *Y02B 20/181* (2013.01)

(58) Field of Classification Search
None
See application file for complete search history.

(56) References Cited

U.S. PATENT DOCUMENTS

| | | | |
|---|---|---|---|
| 6,501,100 B1 | 12/2002 | Srivastava et al. | |
| 7,951,307 B2 * | 5/2011 | Tamaki et al. | 252/301.4 F |
| 2002/0003233 A1 | 1/2002 | Mueller-Mach et al. | |
| 2004/0124758 A1 | 7/2004 | Danielson et al. | |
| 2005/0184638 A1 | 8/2005 | Mueller et al. | |
| 2005/0212397 A1 * | 9/2005 | Murazaki et al. | 313/487 |
| 2007/0128745 A1 * | 6/2007 | Brukilacchio et al. | 438/22 |

FOREIGN PATENT DOCUMENTS

WO    2000033390 A1    6/2000

OTHER PUBLICATIONS

Supplemental European Search Report dated Aug. 12, 2010.
Phosphor Handbook, 2nd Edition, by Yen et al, p. 968.

* cited by examiner

*Primary Examiner* — Matthew W Such
*Assistant Examiner* — Abul Kalam
(74) *Attorney, Agent, or Firm* — Thomas|Horstemeyer, LLP

(57) ABSTRACT

Phosphor compositions, white phosphor compositions, methods of making white phosphor compositions, tinted white phosphor compositions, methods of making tinted white phosphor compositions, LEDs, methods of making LEDs, light bulb structures, paints including phosphor compositions, polymer compositions including phosphor compositions, ceramics including phosphor compositions, and the like are provided.

4 Claims, No Drawings

WHITE PHOSPHORS, METHODS OF MAKING WHITE PHOSPHORS, WHITE LIGHT EMITTING LEDS, METHODS OF MAKING WHITE LIGHT EMITTING LEDS, AND LIGHT BULB STRUCTURES

CROSS REFERENCE TO RELATED APPLICATION

This is a Divisional Application of copending U.S. patent application having Ser. No. 12/298,100 and entitled WHITE PHOSPHORS, METHODS OF MAKING WHITE PHOSPHORS, WHITE LIGHT EMITTING LEDS, METHODS OF MAKING WHITE LIGHT EMITTING LEDS, AND LIGHT BULB STRUCTURES, which claims priority to "WHITE PHOSPHORS, METHODS OF MAKING WHITE PHOSPHORS, WHITE LIGHT EMITTING LEDS, METHODS OF MAKING WHITE LIGHT EMITTING LEDS, AND LIGHT BULB STRUCTURES," having serial number PCT/US2007/069320, filed on May 21, 2007. This application also claims priority to and benefit of U.S. Provisional Patent Application No. 60/809,229, filed on May 30, 2006, and U.S. Provisional Patent Application No. 60/854,264, filed on Oct. 25, 2006, both of which are incorporated by reference in their entirety.

BACKGROUND

White light is light mixed from a plurality of lights of different colors. Visible white light is generated by mixing at least two lights of different wavelengths. For example, when the eyes are simultaneously stimulated by either red, blue and yellow lights or red and green lights, they recognize the incident light as a white light. It would be advantageous to produce light-emitting diodes (LED) and other products using a combination of phosphors emitting light at different colors.

SUMMARY

Briefly described, embodiments of this disclosure include phosphor compositions, white phosphor compositions, methods of making white phosphor compositions, tinted white phosphor compositions, methods of making tinted white phosphor compositions, LEDs including phosphor compositions, methods of making LEDs including phosphor compositions, light bulb structures including phosphor compositions, paints including phosphor compositions, polymer compositions including phosphor compositions, ceramics including phosphor compositions, and the like are provided.

One exemplary composition, among others, includes: a white phosphorous composition including: a first phosphor compound (P1) that emits radiation in a specific color of the visible spectrum, and a second phosphor compound (P2) that emits radiation in a color of the visible spectrum that is complementary to the color emitted by P1, wherein both P1 and P2 have a characteristic that each are excited by incident radiation in the same range of wavelengths, and wherein the combined emissions of P1 and P2 is substantially white light.

Another exemplary composition, among others, includes: a white phosphorous composition including: a first phosphor compound (P1) that emits radiation in a red region of the spectrum, and a second phosphor compound (P2) that emits radiation in a green region of the spectrum, wherein both P1 and P2 have a characteristic that each are excited by incident radiation with a wavelength from about 350 to 480 nm, and wherein the combined emission of P1 and P2 is substantially white light.

Another exemplary composition, among others, includes: a white phosphorous composition including: a first phosphor compound (P1) that emits radiation in a specific color of the visible spectrum, and a second phosphor compound (P2) that emits radiation in a color of the visible spectrum that is complementary to the color emitted by P1, wherein P1 and P2 are excited by incident radiation in different ranges of wavelengths, and wherein the combined emissions of P1 and P2 is substantially white light.

One exemplary ceramic, among others, includes: one or more of the phosphorous compositions described herein.

One exemplary method of making a phosphor composition, among others, includes: providing a first phosphor compound (P1) that emits radiation in a specific color of the visible spectrum; providing a second phosphor compound (P2) that emits radiation in a color of the visible spectrum that is complementary to the color emitted by P1, wherein both P1 and P2 have a characteristic that each are excited by incident radiation in the same range of wavelengths; and mixing the first phosphor with the second phosphor, wherein the mixing is performed by intimately combining P1 and P2 physically or chemically.

One exemplary structure, among others, includes: a LED and a phosphor composition disposed on the LED, wherein the LED emits radiation in a range that the phosphor composition absorbs the radiation, and the phosphor composition emits radiation at a wavelength different than the LED.

One exemplary light bulb structure, among others, includes: a fluorescent light bulb and a phosphor composition disposed on the fluorescent light bulb, wherein the fluorescent light bulb emits radiation in a range that the phosphor composition absorbs the radiation, and the phosphor composition emits radiation at a wavelength different than the fluorescent light bulb.

One exemplary light bulb structure, among others, includes: an incandescent light bulb and a phosphor composition disposed on the incandescent light bulb, wherein the incandescent light bulb emits radiation in a range that the phosphor composition absorbs the radiation, and the phosphor composition emits radiation at a wavelength different than the incandescent light bulb.

DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, physics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings, unless a contrary intention is apparent.

Discussion

Phosphor compositions, white phosphor compositions, methods of making white phosphor compositions, tinted white phosphor compositions, methods of making tinted white phosphor compositions, LEDs, methods of making LEDs, light bulb structures, paints including phosphor compositions, polymer compositions including phosphor compositions, ceramics including phosphor compositions, and the like are provided.

In an embodiment, the white phosphor compositions (e.g., wherein the composition appears to radiate white or substantially white light) include a mixture (e.g., a binary or ternary mixture) of individual phosphor compounds (precursor compounds) physically and/or chemically mixed and/or combined. In addition, tinted white phosphor compositions (e.g., wherein the composition appears to radiate a tinted white light) include a mixture of individual phosphor compounds physically and/or chemically mixed and/or combined. The tinted color can include, but is not limited to, red, green, blue, purple, and yellow. Additional details are described in Example 1.

The phosphor compositions are used in industries such as, but not limited to, paint, ceramic, polymer, electronic/microelectronic, LED, lighting, and the like. The phosphor compositions or combinations thereof can be used in paints, polymer compositions, ceramics, LEDs, powders, and the like. Additional details are described in Example 1.

Embodiments of the disclosure provide LEDs having phosphor compositions disposed on the LED (e.g., the junction and/or a portion of the LED cover). The LED emits radiation at a certain wavelength. The phosphor composition absorbs the emitted radiation of the LED and converts that energy into emitted radiation at a different wavelength (e.g., in the white light wavelength range or another light wavelength range). For example, a blue light (e.g., about 440 nm) emitting LED can emit radiation and the phosphor composition can absorb the radiation and convert it to white light.

In an embodiment, the phosphor composition can be deposited on the semi-conducting junction of the LED. In another embodiment, the phosphor composition can be deposited on a portion of the LED structure or surface separated from the junction. In another embodiment, the phosphor composition is deposited on a surface adjacent the LED, so that it appears the LED is emitting a different wavelength than it is actually emitting. In any of the embodiments, the phosphor composition absorbs the emitted radiation of the LED and converts that energy into emitted radiation at a different wavelength such as in the white light wavelength range.

In an embodiment, a red phosphor compound ($P_{red}$) and a green phosphor compound ($P_{green}$) are physically and/or chemically mixed and/or combined. $P_{red}$ red emits in the red region of the spectrum, while $P_{green}$ emits in the green region of the spectrum. Both $P_{red}$ and $P_{green}$ are excited by the same incident radiation. For example, the incident radiation has a wavelength from about 350 to 480 nm. Mixing appropriate amounts of $P_{red}$ and $P_{green}$ produces a phosphor composition that emits substantially white light when exposed to radiation from about 350 to 480 nm. In another embodiment, mixing an appropriate amount of $P_{red}$, $P_{green}$, and another phosphor produces a phosphor composition that emits tinted white light when exposed to radiation from about 350 to 480 nm.

The phosphors can include, but are not limited to, oxidic phosphors, sulfidic phosphors, phosphate phosphors, aluminate phosphors, borate phosphors, vanadate phosphors, gallate phosphors, arsenate phosphors, germanate phosphors, stannate phosphors, silicate phosphors, fluoride phosphors, oxofluoride phosphors, or combinations thereof. In particular, the phosphors can include, but are not limited to: $Y_3Al_5O_{12}$:Ce; $(Y, Gd)_3(Al, Ga)_5O_{12}$:Ce; $BaMgAl_{10}O_{17}$:Eu; Mn, $Y_2O_2S$:Eu; Bi, $YVO_4$:Eu; $YBO_3$:(Ce, Tb); $(Sr, Ba)_2SiO_4$:Eu; $Ca_2MgSi_2O_7$:Eu; $Sr_2CeO_4$:Eu; SrS:Eu; $SrGa_2S_4$:Eu; (Sr, Ca, Ba)(Al, Ga)$_2S_4$:Eu; $SrY_2S_4$:Eu; (Ca, Sr)S:Eu; (Mg, Ca)S: Eu; SrS:Ce, CaS:Ce, $CaLa_2S_4$:Ce; or CaS:(Ce, Eu), in which the elements noted after the ":" sign are present in the form of dopants. It should be noted that the charge has not been included on portions of the formulae above ($Eu^{2+\ or\ 3+}$, $Mn^{2+\ or\ 4+}$, $Ce^{3+}$, and $Tb^{3+}$), but one skilled in the art can determine the appropriate charge. Also, it should be noted that the positive charge of these ions is balanced by $O^{2-}$ (oxide) and/or $S^{2-}$ (sulfide), as appropriate, leading to electrically neutral compositions. For simplicity, hydrated ("–n $H_2O$") forms of the above compositions are not included herein, as it will be apparent to those of skill in the art that such hydrates would operate in the same way as the anhydrous compounds. In other instances in the present disclosure, charges have been included.

In particular, the green-emitting phosphors can include, but are not limited to: $YBO_3$:(Ce, Tb); $BaMgAl_{10}O_{17}$:(Eu, Mn); (Sr, Ca, Ba)(Al, Ga)$_2S_4$:Eu; $LaPO_4$:(Ce, Tb); $CeMgAl_{11}O_{19}$: Tb; $GdMgB_5O_{10}$:(Ce, Tb, Mn); (Ba, Sr, Ca)$MgAl_{10}O_{17}$:(Eu, Mn, Zn); (Si,Ge)$O_4$:Mn; $SrAl_xO_{(1+3/2x)}$:Eu (x=2-2.4); (Ba, Sr, Ca)$_2SiO_4$:Eu; $(MgO)_3MgP_2GeO_2$:Mn: and $GdB_3O_6$:(Ce, Mn).

In particular, the red-emitting phosphors can include, but are not limited to: $Y_2O_2S$:(Eu, Bi); $YVO_4$:(Eu, Bi); SrS:Eu; $SrY_2S_4$:Eu; $CaLa_2S_4$:Ce; (Ca, Sr)S:Eu; (Y, Gd, La, Lu, Sc)$_2O_3$:Eu; (Y, Gd, La, In, Lu, Sc)$BO_3$:Eu; (Y, Gd, La)(Al, Ga)$O_3$:Eu; (Ba, Sr, Ca)(Y, Gd, La, Lu)$_2O_4$:Eu; (Y, Gd)$Al_3B_4O_{12}$:Eu; $Gd_2O_3$:Eu; (Gd, Y)$_4$(Al, Ga)$_2O_9$:Eu; (Ca, Sr)(Gd, Y)$_3$(Ge, Si)$Al_3O_9$:Eu; (Y, Gd, La, Lu)$_3GaO_6$:Eu; (Sr, Mg)$_3(PO_4)_2$:Sn; $GdMgB_5O_{10}$:Ce; (Sr, Mg)$_3(PO_4)_2$:Sn; and $GdMgB_5O_{10}$:Ce.

In another embodiment, another phosphor compound (P3) can be added to $P_{red}$ and $P_{green}$ to provide for a tinted white phosphor composition. P3 can include phosphor compounds that have a tinted color such as, but not limited to, red, green, purple, blue, and yellow. Additional details are described in Example 1.

In particular, the blue phosphor can include, but is not limited to: (Ba, Sr, Ca, Mg)$_5(PO_4)_3$(Cl, F, Br, OH):(Eu, Mn, Sb); (Ba, Sr, Ca)$MgAl_{10}O_{17}$:(Eu, Mn); (Ba, Sr, Ca)$BPO_5$:Eu; (Sr, Ca)$_{10}(PO_4)_6*nB_2O_3$:Eu; $2SrO*0.84P_2O_5*0.16B_2O_3$: Eu; $Sr_2Si_3O_8*2SrCl_2$:Eu; $Ba_3MgSi_2O_8$:Eu; $Sr_4Al_{14}O_{25}$:Eu; and $BaAl_8O_{13}$:Eu.

In particular, the yellow phosphor can include, but is not limited to: (Sr, Ca, Ba, Mg, Zn)$_2P_2O_7$:(Eu, Mn); and (Ca, Sr, Ba, Mg)$_{10}(PO_4)_6$(F, Cl, Br, OH):(Eu, Mn).

In an embodiment, $P_{red}$ can include compounds such as, but not limited to, $SrGa_2S_{4+a}$:$Eu_a^{2+}$, wherein "a" is a number to yield 0.1 to 10% Eu doping of P1; $CaGa_2S_{4+a}$:$Eu_a^{2+}$, wherein "a" is a number to yield 0.1 to 10% Eu doping of P1; $Ca_xSr_{1-x}Ga_2S_{4+a}$:$Eu_a^{2+}$, wherein "a" is a number to yield 0.1 to 10% Eu doping of P1 and x is greater than 0 and less than 1, and the like. It should be noted that another way in which to describe the formulae described herein is to not include the counter ion. Therefore, compounds such as $SrGa_2S_{4+a}$:$Eu_a^{2+}$ may be represented by $SrGa_2S_4$:$Eu^{2+}$, a representation used herein. Additional details are described in Example 1.

In an embodiment, $P_{green}$ can include compounds such as, but not limited to, CaS:$Eu_a^{2+}$, wherein "a" is a number to yield 0.1 to 10% Eu doping of P2; $(MgO)_3MgP_2GeO_2$:$Mn_b^{4+}$, wherein b is from about 0.0001 to 0.1; and the like. Additional details are described in Example 1.

In an embodiment, $P_{red}$ (e.g., CaS:$Eu^{2+}$) is about 90 to 99 or about 95 to 97 mol % of the composition, and $P_{green}$ (e.g., $SrGa_2S_4$:$Eu_a$) is about 1 to 10 or about 3 to 5 mol % of the composition. Combinations of $P_{red}$ and $P_{green}$ can be used to produce white or substantially white phosphors.

In another embodiment, a combination of $P_{red}$, $P_{green}$, and $P_{blue}$, where $P_{blue}$ is chemically compatible with both $P_{red}$ and $P_{green}$, can be used to produce a tinted phosphor. In an embodiment, the phosphors can be combined according to, $P_{red}$: 95 to 98%, $P_{green}$: 2 to 5%, $P_{blue}$: 0<x<2%, provided that the following constraints, applicable to the example of the current embodiment, are used (i) $P_{red}$+$P_{green}$ is no less than 98% of the total mixture and (ii) $P_{red}$/$P_{green}$ lies between 19 and 32, to yield a "white" phosphor with a blue tint. In an embodiment, if $P_{blue}$ is less than 1% of the overall mixture, the white color is often known is the art as "cool white". Although $P_{blue}$ is noted above, other colored phosphors (P3) can be used such as, but not limited to, $P_{yellow}$. P3 is about 0.1 to 10, about 1 to 5, or about 0.1 to 2 mol % of the composition. Additional details are described in Example 1.

Embodiments of the phosphor compositions can be made using one or a combination of physical mixing or sintering. The physical mixing method includes mixing finely powdered precursors. This can be accomplished by either grinding the precursors together or by suspending both in a non-reacting solvent under vigorous stirring followed by complete evaporation of the solvent. Then, a pellet is formed from the preceding mixture. Subsequently, the pellet is ground into a fine powder to form the phosphor composition. Additional details regarding the physical method of making white phosphor compositions of the present disclosure are described in detail in Example 1.

The sintering method includes mixing the powdered precursors and grinding the mixture. The mixture can be added to a suitable additive (e.g., up to 2 atom % of S in the case of sulfide-based precursors). Next, the mixture is sintered at a temperature in the range of about 800° C. to 1350° C. range, under a suitable atmosphere (e.g., air for oxides containing metal ions in high oxidation state, $N_2$:$H_2$S or $N_2$:$CS_2$ for sulfides, $N_2$:$H_2$ for metals in low oxidation states, etc.), for about 1 to 3 h to form a ceramic. In another embodiment, the mixture is formed into a pellet prior to sintering. Additional details regarding the sintering method of making white phosphor compositions of the present disclosure are described in detail in Example 1.

Phosphor Combinations

Embodiments of the present disclosure include materials (e.g., enamels, waxes, varnishes, paints, and polymers) that include phosphor compositions as described herein. The disclosed phosphor compositions can be combined with additional materials such as a carrier or vehicle to produce, for example, a composite, laminate, mixed material, blended material, suspension, colloid, fluid, spray, gel, wax, crystal, film, or mist that retains the phosphorescent properties of the particular phosphor composition used. Exemplary materials that could be combined with the disclosed phosphors include, but are not limited to a matrix, resin, powder, or fluid.

The additional material to be combined with the disclosed phosphor compositions is typically translucent and does not significantly absorb energy needed to excite the phosphor or absorb energy emitted from the phosphor. For example, material containing pigments combined with the phosphor can be selected so that the pigments do not absorb the excitation energy needed to excite the phosphor, or do not absorb the energy emitted by the phosphor. Combinations of phosphors with pigments of a color other than that emitted by the phosphor can be used to produce a third color different from both the phosphor emission and the pigment.

Additionally, the material can be selected to minimize a decrease in efficiency of the emitter due to thermal effects, i.e., during the process of conversion of UV radiation into visible radiation. Some of the incident energy can be transferred to the matrix by vibrations of the phosphor that coincide in energy with vibrations of the matrix. Molecular (matrix) and reticular (phosphor) vibrations occur in the infra-red portion of the spectrum. This region is characterized by the heat radiation, associated with atomic and molecular motions. This system crossover is rather common and should be considered for all blends.

In some embodiments, the materials combined with the disclosed phosphor compositions typically do not detrimentally react with the phosphor, for example, causing degradation of the phosphor or phosphor properties. Suitable non-reactive materials include, but are not limited to, polymers, organic solvents, paint, resin, ink, coloring agents, natural or synthetic polymers such as nylons, urethanes, acrylics, carbohydrates, proteins, aliphatic hydrocarbons, lipids, wax, fatty acids, plastics, thermoplastics, elastomers, thermoelastomers, polypropylene, polyethylene, branched aliphatic hydrocarbons, fluoropolymers, silicones, and/or polysiloxanes.

Composition Applications

As mentioned above, the composition including the phosphor can be included in a matrix, a resin, a fluid, a wax, a paint, a vehicle, a carrier, a powder, or a combination thereof. As such, the composition can be included in many applications as described previously. For example, the composition can be used in writing implements (e.g., crayons), paints, resins, polymer (e.g., thermosetting polymers and thermoplastic polymers), and the like. The composition also can be mixed with other components, with the resultant mixture having the characteristics of the composition.

Writing Implements

Generally, the phosphor is incorporated into writing implements that can apply the composition to a surface, for example a crayon or other writing implement. One embodiment of the present disclosure provides crayons composed of a clear synthetic resin (matrix) and one or more of the disclosed compositions dispersed therein. The compositions are generally in the form of powders that are insoluble in a dispersion medium. The proportion of the composition in the crayon can be modified according to the kind of composition and other factors but is usually about 0.1-30 weight %, preferably 1-20 weight %.

The disclosed writing implements can also contain a gelling agent. The gelling agents can be those used in conventional gel crayons. For example, at least one of dibenzylidenesorbitol and tribenzylidenesorbitol series compounds can be used. Thus, at least one member selected from the group consisting of dibenzylidenesorbitol, tribenzylidenesorbitol, and their derivatives can be utilized.

The dibenzylidenesorbitol derivatives mentioned above include, but are not limited to, compounds available upon substitution of the benzene nucleus of each benzylidene group of dibenzylidenesorbitol with a $C_{1-3}$ alkyl group in an optional position, thus including such species as [di(p-methylbenzylidene)]sorbitol, [di(methylbenzylidene)]sorbitol, and [di(p-chlorobenzylidene)]sorbitol, among others. The above-mentioned tribenzylidenesorbitol derivatives include but are not limited to compounds available upon substitution of the benzene nucleus of each benzylidene group of tribenzylidenesorbitol with a $C_{1-3}$ alkyl group in an optional position, thus including such species as [tri(p-methylbenzylidene)]sorbitol, [tri(methylbenzylidene)]sorbitol, and [tri(p-chlorobenzylidene)]sorbitol, among others.

The amount of the gelling agent in the crayon can be judiciously selected according to the kind of gelling agent, but may be usually about 2-12 weight % and preferably 3-8 weight %. If the gelling agent is used in an excessive proportion, the gel will become too hard so that the coloring power of the crayon may deteriorate. If the proportion of the gelling agent is too small, coagulation will not occur easily.

In some embodiments, an organic solvent can be used so long as it does not interfere with the properties of the composition, and known organic solvents can be used. Among such known solvents, monohydric alcohols, glycols, glycol ethers, and their esters are used with advantage in the present disclosure. The monohydric alcohols include, but are not limited to, ethanol, methanol, and isopropyl alcohol. The glycols include, but are not limited to, ethylene glycol, propylene glycol, diethylene glycol, dipropylene glycol, and hexylene glycol. The glycol ethers include, but are not limited to, glycol methyl ethers, glycol ethyl ethers, glycol propyl ethers, and glycol butyl ethers.

The proportion of the organic solvent in embodiments of the disclosed crayon can be selected in relation to the composition and other components, but may be usually about 20-80 weight %, preferably 30-65 weight %. If the organic solvent is excessive, gelation may not occur. On the other hand, if the amount of organic solvent is too small, the other components will not sufficiently dissolve and may result in a non-homogenous gel.

The resin component is not particularly restricted in kind but the various resins that are used in the gel crayon or the like can be utilized. One or more resins can be used, including but not limited to, a film-forming resin and an adhesion-improving resin, alone or in combination.

The film-forming resin is not particularly restricted in kind, so long as it is capable of enhancing the hardness of the phosphorescent crayon and forming a tough film on the substrate surface. Thus, for example, cellulosic resins such as cellulose acetate butyrate, ethylcellulose, acetylcellulose, etc. and vinyl resins such as polyvinyl butyral, polyvinyl acetate, vinyl acetate-vinyl chloride copolymer resin, vinyl acetate-ethylene copolymer resin, etc. can be used. Those resins can be used each independently or in a combination of two or more species. Among the above-mentioned resins, polyvinyl butyral resins with an acetyl content of 5% or less, a hydroxyl content of 18-27%, a butyral content of 69% or more and a degree of polymerization in the range of 300-2000 are particularly suitable.

The adhesion-improving resin is not particularly restricted in kind, either, only provided that it is capable of improving adhesion to the substrate surface. Thus, for example, ketone resin, xylene resin, and amide resin can be used. The ketone resin can, for example, be the product of condensation between cyclohexanone and formaldehyde. The xylene resin may for example be the product of condensation between m-xylene and formalin. The amide resin may for example be a thermoplastic resin available upon polycondensation of a dimer acid and a di- or polyamine and having a molecular weight of about 4000 to 9000. Those adhesion improving resins can also be used each independently or in a combination of two or more species.

The proportion of the resin component in the crayon should vary with different kinds of resins but may be generally about 3-40 weight % and preferably 6-35 weight %. If the resin component is excessive, the gel will become too hard so that the coloring power of the crayon may deteriorate. If the amount is too small, gelation will be difficult to occur.

The formulating amounts of said film-forming resin and adhesion-improving resin can also be selected in relation to the other components, but the recommended ratio of film-forming resin to adhesion-improving resin is about 1:0.1-5 by weight, preferably 1:0.2-3 by weight.

Embodiments of the disclosed crayon can include other known additives such as a colorant, filler, leveling agent, viscosity modifier, thixotropic agent, dryness imparting agent, etc. in suitable amounts where necessary. Moreover, a plasticizer such as diethyl phthalate, dibutyl phthalate, dioctyl phthalate, 2-ethylhexyl epoxyhexahydrophthalate, 2-ethylhexyl sebacate, tricresyl phosphate, etc. can also be incorporated in a suitable amount.

The gel strength of the crayon can be set according to the intended use for the end product, but is generally set at about 5-50 kg/cm$^2$ and preferably at 7-30 kg/cm$^2$. The gel strength can be modified by varying the kinds and formulating amounts of the organic solvent and/or gelling agent, for instance.

The method for production of one embodiment of the crayon comprises blending the above-mentioned components uniformly. A typical procedure comprises dissolving the film-forming resin etc. in an organic solvent, optionally dispersing a colorant thoroughly in the solution using a mill or the like, dissolving the organic solvent, adhesion-improving agent, and dispersing the composition therein, casting the final solution in a mould having a desired profile, and cooling the contents to solidify in situ. In carrying out the above procedure, heat may be applied for dissolving the respective components.

Phosphorescent Paints

Another embodiment of the present disclosure provides a paint composition including one or more of the disclosed compositions. The paint compositions can be water soluble or oil-based. Water soluble compositions can contain a water miscible or compatible resin, for example, a polyurethane resin. The polyurethane resin (e.g., an acrylic urethane resin in either a semi-gloss or gloss) used in the composition can be a thermoplastic polymer derived or produced by the reaction of a polyisocyanate such as a diisocyanate (toluene diisocyanate) and a hydroxyl-containing material, for example, a polyol derived from propylene oxide or trichlorobutylene oxide, containing a water soluble group such as hydroxy, carboxylic acid or amine group. The amount of water miscible polyurethane resin (semi-gloss or gloss) used ranges from about 1% to about 80%, with a preferred range from about 3% to about 75%, more preferred from about 5% to about 70%, and a most preferred from about 10% to about 65% by volume of the paint composition.

The water-based dispersions utilized in the present disclosure also can be used in commercially produced water based paints containing various colors used, for example, in painting highway surfaces including white, yellow, orange, red, blue, and green. These types of paints may, for example, be used as a highway paint colored with the appropriate highway or roadway colors of such as white (titanium dioxide [ASTM D476, Type II] 100% purity), yellow (medium chrome yellow [ASTM D211, Type III] 100% purity), orange, and blue. The water based colored dispersion represents from about 30% to about 98%, typically a range being from about 40% to about 95%, more typically a range from about 50% to about 90%, and most typically a range being from about 55% to about 88% by volume of the water based paint composition.

The selection of the amount of composition, colored paint dispersion, and polyurethane resin from within the ranges discussed above, is effected, for example, by the color of the paint dispersion. Yellow paints require increased amounts of composition in comparison to white paints. The selected ranges permit a careful balance of the water-based compositions with other paint ingredients resulting, for example, in a highway paint composition with maximum desirable characteristics for all traffic conditions.

Optionally, a particulate may be used to impart abrasiveness to the paint composition and is either a natural abrasive material such as fine sand, silica, ground marble (white marble preferred), corundum (aluminum oxide, emery), pumice, iron oxide and feldspar. The more important synthetic types are silicon carbide, boron carbide, cerium oxide and fused alumina; or even some reflective substances (for example crushed reflective glass) as long as they will impart an effective abrasiveness to the surface of the dried paint. This abrasiveness reduces the likelihood of skidding by motor vehicles both in clear weather as well as when the surface of the road is wet. The operable range is an additive amount from about 1% to 15% parts by volume, with a preferred range of about 1% to 13%, with from about 1% to 9% being the most preferred.

Another embodiment provides a luminescent paint that contains a binder to adhere the particles of the compositions in the final product. The binder is selected to provide good adherence of the phosphor particles to each other and of the particles to the underlying substrate, with acceptable physical properties.

The binder includes, but is not limited to, a cross-linked and polymerized dimethyl silicone copolymer, which is flexible and resistant to degradation in ultraviolet (UV) light. This binder is disclosed in greater detail in U.S. Pat. No. 5,589,274, whose disclosure is incorporated by reference. The silicone polymer exhibits a good degree of deformability without cracking, both when pigment is present at moderate levels and when it is not present. This deformability permits the final solid paint to deform during the bending of the substrate when a thin substrate is used, or to permit the film to deform. The deformability of the binder also improves the resistance of the paint or film to cracking as a result of impacts and the like during service. Other flexible polymeric materials may be used for the matrix, such as silicone-modified epoxy, polyurethane, poly(dimethylsiloxane), poly(dimethylsiloxane-co-methylphenylsiloxane), and polyamide.

The binder is present in an operable amount. In a typical case, the binder is present in an amount such that the ratio, by weight, of the composition to the binder is from about 3:1 to about 5:1. If the ratio is less than about 3:1, the resulting paint tends to be transparent after drying. If the ratio is more than about 5:1, the critical phosphor volume concentration (CPVC) may be exceeded, the paint has insufficient mechanical strength, and the paint falls apart when dried.

The mixture of phosphor and binder is ordinarily a solid, and a paint vehicle may be added to form a solution or a slurry that may be applied using conventional painting techniques. An exemplary paint vehicle is naphthalene or xylene. The amount of the paint vehicle is selected to provide a consistency that permits application of the paint by the desired approach. For example, application by spraying requires the use of more of the paint vehicle than application by brush or roller.

The composition particles, binder, and paint vehicle are mixed and milled together to form a liquid paint formulation in which the particles do not rapidly separate. There may be some separation over extended periods of time, but the paint is normally stirred or agitated just before or at the time of application.

Resins

The disclosed compositions may be combined or dispersed in organic, inorganic, natural or synthetic resins. Suitable organic resins include but are not limited to polyoxyalkylene polymers such as polyoxyethylene, polyoxypropylene, polyoxybutylene, polyoxytetramethylene, polyoxyethylene/polyoxypropylene copolymer, and polyoxypropylene/polyoxybutylene copolymer; hydrocarbon polymers such as ethylene/propylene copolymer, polyisobutylene, isobutylene/isoprene copolymer, polychloroprene, polyisoprene, isoprene or butadiene/acrylonitrile and/or styrene copolymer, polybutadiene, isoprene or butadiene/acrylonitrile, and/or styrene copolymer, and hydrogenated polyolefin polymers obtained by hydrogenating these polyolefin polymers; polyester polymers obtained by the condensation of dibasic acids such as adipic acid with glycols or by the ring-opening polymerization of lactones; acrylate ester polymers such as polyacrylate esters obtained by the radical polymerization of monomers such as ethyl acrylate and butyl acrylate and acrylate ester copolymers of acrylate esters such as ethyl acrylate and butyl acrylate with vinyl acetate, acrylonitrile, methyl methacrylate or styrene; graft polymers obtained by the polymerization of a vinyl monomer in the above organic polymers; polysulfide polymers; polyamide polymers such as nylon 6 obtained by the ring-opening polymerization of $\epsilon$-caprolactam, nylon-6,6 obtained by the polycondensation of hexamethylenediamine with adipic acid, nylon-6,10 obtained by the polycondensation of hexamethylenediamine with sebacic acid, nylon-11 obtained by the polycondensation of $\epsilon$-aminoundecanoic acid, nylon-12 obtained by the ring-opening polymerization of $\epsilon$-aminolaurolactam, and nylon copolymers having two or more components selected from the above nylons; polycarbonate polymers obtained by, for example, the polycondensation of bisphenol A with carbonyl chloride; diallylphthalate polymers; and the like. Polymers having the above main chain structures include, but are not limited to, polyester polymers, acrylate ester polymers, acrylate ester copolymers, polyoxyalkylene polymers, hydrocarbon polymers, polycarbonate polymers, and the like.

Additional resins useful in the disclosed compositions include epoxy resins. Suitable epoxy resins may be saturated or unsaturated or mixed, linear or branched or mixed, aliphatic, aliphatic with aromatic moieties, heterocyclic or mixed, and may bear other substituents, which do not materially interfere with the desired curing reaction. Examples of such substituents include, but are not limited to, halogens such as bromine and chlorine and substituted aliphatic or aromatic groups. Aliphatic epoxy resins are preferred for applications in highly ultraviolet (UV)-resistant topcoats, while polyglycidyl ethers of di- or polyhydric phenol type aromatic epoxy resins (infra) can be used preferably for other types of applications.

Additionally, the epoxy resin may be monomeric or polymeric (including polymers and oligomers in all forms from dimers and up). Depending primarily on their chemical compositions and molecular weights, the epoxy resins can be liquid, solid or mixtures under ambient conditions, particularly at room temperature (about 25° C.). Liquid epoxy resins under ambient conditions are more preferred for the curable epoxy composition of the present disclosure. If solid epoxy resins are used, it is preferred to dissolve them in a suitable solvent to make epoxy resin containing solutions for ambient condition applications. Epoxy resin suspensions or emulsions may also be used.

One group of suitable epoxy resins, including the glycidyl or polyglycidyl ethers, may be prepared by reacting epichlorohydrin with a compound containing at least one, preferably at least two or more, hydroxyl groups under basic conditions, such as in an alkaline reaction medium or in the presence of a suitable base. Examples of such suitable epoxy resins include, but are not limited to, polyglycidyl ethers of poly- or dihydric phenols, polyglycidyl ethers of glycols or polyglycols, epoxy novolacs, other glycidated polyphenolic resins, polyglycidyl esters of polycarboxylic acids, fusion reaction products between these epoxy resins and additional polyhydric phenolic compounds (as those disclosed and described in U.S. Pat. Nos. 3,477,990 and 4,734,468, both of which are incorporated herein in their entirety) and mixtures thereof. Examples of suitable phenolic compounds used in preparing these epoxy resins include, but are not limited to resorcinol, catechol, t-butylcatechol, hydroquinone, bisphenol A (BPA), bisphenol E (BPE), bisphenol F (BPF), tris(4-hydroxyphenyl)methane, 1,1-bis(4-hydroxyphenyl)isobutane, 2,2-bis(4-hydroxyphenyl)butane, 2,2-bis(4-hydroxy-3-tert-butylphenyl)propane, 1,1-bis(4-hydroxyphenyl)cyclohexane, 2,6,2',6'-tetrachloro-p,p'-bisphenol A, 2,6,2',6'-tetrabromo-p,p'-bisphenol A, 2,6,2',6'-tetramethyl-3,5,3'-tribromo-p-p'-biphenol, 2,6,2',6'-tetramethyl-3,5,3',5+-tetrabromo-p,p'-biphenol, tetramethylbiphenol, 1,5-dihydroxynaphthalene, bis(2-hydroxy-1-naphthyl)methane, bis(4-hydroxyphenyl) sulfone, bis(4-hydroxyphenyl) ether and the like and mixtures thereof. Some examples of commercially available epoxy resins of this group include, but are not limited to, EPON$^R$ Resins 825, 826, 828, 862 and 1000 from Shell Chemical Company. EPON$^R$ is a registered trademark of Shell Oil Company.

Another group of epoxy resins within the scope of the present disclosure is useful for elastomeric or semi-elastomeric secondary containment membrane applications due to the desired low viscosity, low modulus and high elongation properties of the cured product. This group includes, but is not limited to, polyglycidyl ethers of aliphatic or cycloaliphatic glycols or triols or polyols, or polyglycols. Examples of these glycols include, but are not limited to, 1,4-butanediol, 1,5-pentanediol, 1,6-hexanediol, neopentyl glycol, cyclohexanedimethanol, hydrogenated BPA, polyethylene glycol, polypropylene glycol, trimethylolethane, trimethylolpropane and mixtures thereof Similar to the di- and polyhydric phenol is based epoxy resins, these aliphatic glycidyl and polyglycidyl ethers are usually prepared by reacting epichlorohydrin with a selected aliphatic diol (or triol or polyol or polyglycol or mixtures) in the presence of a Lewis acid catalyst, followed by conversion of the reaction intermediate(s) with sodium hydroxide to the product(s). Examples of commercially available epoxy resins in this group include, but are not limited to, HELOXY$^R$ Modifier 32 (a diglycidyl ether of a poly(propylene oxide)glycol), HELOXY$^R$ Modifier 68 (the diglycidyl ether of neopentyl glycol) and HELOXY$^R$ Modifier 107 (the diglycidyl ether of 1,4-cyclohexanedimethanol) from Shell Chemical Company. HELOXY$^R$ is a registered trademark of Shell Oil Company.

Suitable natural polymers include, but are not limited to, cellulose, starch, polysaccharides, wool, and silk.

Those of ordinary skill in the art will appreciate that the compositions of this disclosure can be prepared using starting materials other than those specifically disclosed herein and that procedures and techniques functionally equivalent to those described herein can be utilized to make and assess the phosphors herein. Those of ordinary skill in the art will also appreciate that the host matrix of this disclosure may accommodate metal ions other than those specifically mentioned herein without significant effect upon composition properties.

LED Construction

Such combinations of phosphors of the present disclosure with resins (e.g., epoxy resins) can be used, for instance, for the manufacture of light emitting diodes (LEDs). In one embodiment, a suitable semiconductor emitter is used as the basis for the construction of a given LED. By using the method of the present disclosure for the selection of a phosphorescent combination, as described in, for instance, Example 1, a LED of any color can be produced by encapsulating the emitter in a mixture of the phosphorescent combination with an epoxy resin, which can be shaped into any solid geometry to include the LED. The phosphorescent combination is excited by the radiation emitted by the emitter and will emit radiation in a color (with our without a tint) determined by the composition of the phosphorescent mixture.

The methods of the present disclosure allow for the construction of LEDs of any color, based on the same emitter, since a plurality of phosphorescent combinations can be selected to be excited by the same emitter. Consequently, the methods of the present disclosure obviate the need for specific emitters for the manufacture of LEDs of specific colors, with a desired tint for use in, for instance, decorative lighting.

Powders

Phosphors of the present disclosure can be mixed with (or, alternatively, replace) phosphorescent materials used in, for instance, the manufacture of fluorescent light bulb structures, as well as, incandescent light bulb structures in order to optimize the efficiency of these devices.

Fluorescent bulbs normally include a sealed tube containing a small amount mercury (Hg) vapor which, when excited emits radiation with wavelengths of 404.66, 407.78, 435.84, 491.60, 546.07, 576.96, and 579.07 nm. The tube is coated with a phosphorescent material that will absorb radiation in the above wavelengths, preferably from about 400 to 450 nm, and emit radiation in the shape of a broad band, or a complex composition of broad and sharp bands, in the visible radiation. A common characteristic of the currently used phosphors is that they display only weak emissions at either edge, or both edges (e.g., about 400 to 450 nm and about 700 to 800 nm) of the visible spectrum, often hindering these lamps from emitting an un-tinted white light.

White phosphors produced according to the method of the present disclosure absorb radiation above 450 nm, and will emit radiation in those edges, thus improving the emission qualities of fluorescent bulbs.

Fluorescent lights can also be built with xenon (Xe) as the emitter, instead of Hg. In addition of environmental benefits, the use of xenon allows for access to high-energy wavelengths of emission, specifically the intense lines at 117.04, 119.2, 125.1, 129.56 and 146.96 nm, all within the region of vacuum UV, in addition to emission lines in the near UV and blue spectral regions. Phosphors used in xenon lamps absorb primarily radiation in the near UV and blue spectral regions, to emit visible light. It is estimated that about 12% of xenon's emission output is in wavelengths shorter than 350 nm. Phosphors of the present disclosure can then be engineered to absorb radiation below 350 nm (preferably between 100 and 150 nm) and down convert the radiation into white light, increasing the efficiency of these lamps by as much as 12%.

Incandescent light bulbs, on the other hand, emit radiation preferably in the near-IR region (above 80%), followed by visible radiation, and UV radiation (less than 5%). Although phosphors of the present disclosure do not provide for up-conversion from near-IR to visible, they can be added as an inner coating to said bulbs to down-convert near-UV and blue emissions into white light, increasing the efficiency of said bulbs by as much as 5%.

EXAMPLES

Now having described the embodiments of the present disclosure, in general, example 1 describes some additional embodiments of the present disclosure. While embodiments of the present disclosure are described in connection with example 1 and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

White phosphors are comprised of individual phosphors that each emit light at certain well-defined wavelengths. Careful mixing of these phosphors and well-defined processing of said mixtures to yield a white-emitting phosphor is described herein.

Precursor phosphors (the aforementioned "individual phosphors") are identified by the symbol "P" throughout this document.

The disclosure also provides for methods of making white phosphors with a tint of a preferred primary or secondary color. The "tinted" white phosphors being useful in signaling and decorative purposes, among other uses.

Discussion

The phosphors are comprised of an (i) intimate physical mixture, or (ii) a chemical combination of individual ("P") phosphors. In one embodiment, one of the individual phosphors emits in the red region of the spectrum ($P_{red}$) while the other emits in the green region, $P_{green}$. Both $P_{red}$ and $P_{green}$ are excited by incident radiation with wavelengths in the 350 to 480 nm or 430 to 450 nm range. Therefore, a phosphor produced according to methods (i) and (ii) above, using an appropriate molar ratio between $P_{red}$ and $P_{green}$, emits white light when exposed to radiation in the 350 to 480 nm or 430 to 450 nm wavelength range.

In another embodiment, the phosphor composition can include other combinations of $P_{red}$ and $P_{green}$, in an appropriate ratio, provided that $P_{red}$ and $P_{green}$ are excited by the same incident radiation. Therefore, phosphors that are excited by UV radiation and emit white light can be produced according to the methods herein.

Embodiments of the present disclosure include a family of phosphorescent ceramic materials that emit white light. Each of these novel phosphors can be binary (i.e., the product of two precursor phosphors) or ternary (three precursors). Each phosphor is comprised of precursors that are excited by the same wavelength of incident radiation.

In addition, embodiments of the present disclosure provide for methods to manufacture a wide variety of white phosphors, with or without a tint of a primary or secondary color.

Synthesis of Precursors

Illustrative Examples $SrGa_2S_4:Eu_a^{2+}$ ("P1")

$Eu^{2+}$ appears as a doping agent, in the 0.1 mol % to 10 mol % range.

Reagents:
  $SrCO_3$ W=147.63 g mol$^{-1}$
  $Ga_2O_3$ W=187.44 g mol$^{-1}$
  $Eu_2O_3$ W=351.93 g mol$^{31\ 1}$ (All used as very fine powders. Also, W stands for molecular weight)

About 14.76 g of $SrCO_3$ (0.1 mol) are intimately mixed with 18.74 g (0.1 mol) of $Ga_2O_3$ using magnetic stirring. The mixture is covered with water (at least twice the volume of the original solid mixture), under moderate stirring. $Eu_2O_3$ (1.76 g; 0.005 mol, a=0.1 or 10% Eu doping—each $Eu_2O_3$ contributes 2 Eu) is slowly added to the suspension, with fast stirring. The water is evaporated by slow heating. The resulting dry solid is grinded and transferred to a ceramic (or quartz) tube, through which a mixture of $H_2S$ and $N_2$ is passed, while the tube is heated at a temperature from about 800° C. to 1000° C. for one hour.

The resulting solid may be allowed to cool down to room temperature and used as is, or may be subjected to another grind and heat cycle, as desired.

P1 emits light with $\lambda_{max}=536$ nm (green) when excited by incident radiation in the 350 nm to 475 nm range.

$$CaGa_2S_4:Eu_a^{2+} \quad (\text{"P2"})$$

This compound can be prepared in the same way as P1, by using $CaCO_3$ instead of $SrCO_3$. The value of "a" can be adjusted to yield anywhere between 0.1% and 10% Eu doping)

P2 has a peak emission at 558 nm (canary-green) and is excited by incident radiation from about 300 to 460 nm range.

$$(Ca,Sr)Ga_2S_4:Eu^{2+} \text{ (or } Ca_xSr_{1-x}Ga_2S_4:Eu_a^{2+}, 0<x<1) \quad (\text{"P3"})$$

As a general procedure, x moles of P1 are mixed with (1-x) moles of P2. The mixture is ground and sintered in a quartz tube, at 850° C. for 2 h, under a flow of $N_2$ bubbled through $CS_2$. Alternatively, a small amount (less than 1%) of elemental sulfur may be added to the original mixture to aid in ensuring against eventual reductive elimination of sulfur.

As noted above, the $Ca^{2+}$ derivative (P2) has a peak emission at 558 nm while the $Sr^{2+}$ derivative (P1) emits at $\lambda_{max}=536$ nm By adjusting the amounts of P1 and P2 in the pre-sintering mixture (i.e., by adjusting the value of x or of the x/(1-x) ratio), the resulting wavelength of emission can be tuned to fall within 536 nm and 558 nm.

$$CaS:Eu_a^{2+} \quad (\text{"P4"})$$

$CaCO_3$ is reacted with $Eu_2O_3$ in a ratio leading from 0.1 mole % to 10 mole % doping by $Eu^{2+}$, using the same procedure described for P1 and P2 above, with sintering of the reaction mixture being carried under a $H_2S$-rich atmosphere. Alternatively, up to 2% weight of elemental sulfur can be added to the starting mixture, thus facilitating the complete conversion of the carbonate and oxide into sulfides.

When excited by incident radiation with wavelengths from about 400 and 575 nm, this material will phosphoresce with a somewhat broad emission band with $\lambda_{max}$ between 649 nm and 655 nm (red), the value of $\lambda_{max}$ being dependent upon the level of $Eu^{2+}$ doping.

$$(MgO)_3 \cdot MgP_2 \cdot GeO_2:Mn_b^{4+} \quad (\text{"P5"})$$

One mol of this compound can be prepared by mixing 3 moles of MgO, 1 mol of $MgP_2$, 1 mol of $GeO_2$ and the appropriate amount of MnO (or $MnO_2$) necessary to provide for $Mn^{4+}$ doping in the 0.01 mol% to 10 mol% range (i.e., $0.0001 \le b \le 0.1$). The mixture is sintered at 1300° C. in open atmosphere (thus providing for $Mn^{2+}$ in MnO to be oxidized to $Mn^{4+}$ in the final product).

Alternatively, a small fraction of MgO can be replaced with the molar equivalent of $Mg(O_2)$—magnesium peroxide—to aid in the oxidation of $Mn^{2+}$.

P5 emits in the red spectral region, with two peaks, one at 640 nm and the second at 655 nm, when excited by incident radiation of about 220 to 480 nm.

Synthesis of White Phosphors

In preferred embodiments, 95 mol % to 97 mol % of P1 (or P2) are mixed with 3 mol % to 5 mol % of P4 (or P5).

The mixture can be processed in at least two ways:

Physical Mixture:

The mixture is grinded, pressed into a pellet and grinded once again to yield a mixture that will emit white light when optimally excited by radiation from about 400 to 450 nm, although efficient excitation by incident radiation from about 350 and 480 nm can be obtained.

Chemical Processing (Sintering):

The mixture is grinded, pressed into a pellet, and heated under a $H_2S:N_2$ flow at a temperature from about 900° C. to 1300° C., preferably above 1000° C., for 1 h. Alternatively, a flow of $N_2$ bubbled through $CS_2$ can be used or, a small amount of S can be added to the mixture prior to pressing into a pellet. The resulting solid is chemically distinct from a simple mixture of the precursors.

The $P1_{0.95}:P4_{0.05}$ mixture is a special case that will emit white light with no observable tint of a primary or secondary color. Similarly, other mixtures such as $P1_y:P5_z$, $P2_y:P4_z$, $P2_y:P5_z$, $P3_y:P4_z$, $P3_y:P5_z$, where y+z=1, can have their y/z ratio adjusted to yield a "pure white" emitter, or one with a specific reddish, greenish, bluish or yellowish tint, useful for the manufacture of a wide range of customizable phosphorescent pigments, for diverse uses. A notable case is $P3_{0.96}:P4_{0.04}$, which emits white light with a very subtle yellow tint.

Exemplary embodiments of this disclosure, listed below, provide for compositions that yield white-emitting phosphors, and are used herein to illustrate the general method for the selection of starting phosphors that, when combined, yield white phosphors. These examples are not limiting though, and the methods of customization described further herein will expand the scope of the possible compositions.

Embodiments

1. A Silicate
  $P_{red}$ is $Mg_2SiO_4:Mh^{2+}$, excited from 200 nm to 300 nm
  $P_{green}$ is $Zn_2SiO_4:Mn^{2+}$ excited from 200 nm to 300 nm
  Mixture or sintering derivative is optimally excited from 200 nm to 300 nm 2. First Oxide
  $P_{green}=ZnO:S$ (emission is bluish-green), excited from 255 nm to 365 nm
  $P_{red}=ThO_2:Eu^{3+}$ (emission is orange-red), excited from 254 nm to 365 nm
  Mixture or sintering derivative is optimally excited from 255 nm to 365 nm 3. Second Oxide
  $P_{red}=La_2O_3:Eu^{3+}$, excited from 280 nm to 350 nm
  $P_{green}=La_2O_3:Pb^{2+}$, excited from 275 nm to 400 nm
  Mixture or sintering derivative is optimally excited from 280 nm to 350 nm 4. Third Oxide
  $P_{yellow}=CaO:Mn^{2+}$ (emission is orange-yellow), excited from 280 nm to 380 nm
  $P_{violet}=CaO:Bi^{3+}$ (emission is violet), excited from 250 nm to 320 nm
  Mixture or sintering derivative is excitable from 280 nm to 320 nm General Methods for the Manufacture of White Phosphors Phosphors emitting in complementary colors can be combined to yield a white-emitting phosphorescent material. Two methods can be used to combine the precursors: (i) physical mixing, and (ii) sintering.

In general, the method (i) is comprised of the following steps:

1—Mixing finely powdered precursors. This can be accomplished by either grinding the precursors together or by suspending both in a non-reacting solvent under vigorous stirring followed by complete evaporation of the solvent 2—Making a pellet of the mixture obtained above 3—Grinding the pellet into a fine powder, to form the desired white phosphors Method (ii) is comprised of the following steps
1—Mixing powdered precursors and grinding said mixture
2—Adding a suitable additive if necessary (e.g., up to 2 atom % of S in the case of sulfide-based precursors)
3—Sintering the mixture at a temperature in the 800° C. to 1350° C. range, under suitable atmosphere (e.g., air for oxides containing metal ions in high oxidation state, $N_2$:$H_2$S or $N_2$:$CS_2$ for sulfides, $N_2$:$H_2$ for metals in low oxidation states, etc.), for 1 h to 3 h.

A modification of Method (ii) is comprised by making a pellet of the mixture obtained after step 1 (or 2) and sintering the pellet.

Method for Selecting and Mixing Precursor Phosphors to Yield a White-Emitting Material.

The precursor phosphors are excited at the same wavelength range. For binary mixtures the precursors emit light in respectively complementary colors. Precursor phosphors will emit in a primary color ($P_{red}$, $P_{yellow}$, $P_{blue}$) or a secondary color ($P_{orange}$, $P_{green}$, $P_{violet}$ or $P_{purple}$).

It should be noted that: $\epsilon_{color}$=efficiency of conversion of incident radiation into emitted radiation of a certain color by the precursor phosphor ($P_{color}$); $L_{color}$=Radiance of the radiation emitted by the $P_{color}$; E=Total irradiance onto the phosphor ($P_{color}$) in the range of wavelength at which the phosphor is excited to emit radiation in the λ range of emission (Incident radiation).

With L and E being measurable quantities. It is clear for one skilled in the art that L is the integral of the area under the emission spectrum for a phosphor, between the limits of wavelengths of emission.

Then:

$$\epsilon_{color} = L_{color} \cdot E^{-1}$$

A combination of precursor phosphors in a proportion that is inversely proportional to the ratio between their respective, individual $\epsilon$ values provides for a means to compensate for differential efficiencies and ensure that the emitted radiation has no preferential tint, as exemplified below.

For example:
$P_{green}$=ZnO:S (emission is bluish-green), excited from about 255 to 365 nm. Emits from about 450 to 550 nm ($\lambda_{max}$=506 nm); and
$P_{red}$=ThO$_2$:Eu$^{3+}$ (emission is orange-red), excited from about 254 to 365 nm. Emits with sharp lines from about 588 to 635 nm ($\lambda_{max}$=629 nm, 608 nm and 592 nm).

The mixture or sintering derivative is optimally excited from about 255 to 365 nm.

$$\epsilon_{green} = L_{(450\ nm\ to\ 550\ nm)} \cdot (E_{(255\ nm\text{-}365\ nm)})^{-1}$$

$$\epsilon_{red} = L_{(588\ nm\text{-}635\ nm)} \cdot (E_{(255\ nm\text{-}365\ nm)})^{-1}$$

The methods of this disclosure are then used to calculate the proportion in which the phosphors are mixed:

$$\epsilon_{red}/\epsilon_{green} = m_{green}/m_{red}$$

where:
$m_{green}$=mass of finely pulverized $P_{green}$;
$m_{red}$=mass of finely pulverized $P_{red}$.

Therefore, by determining the values of $\epsilon_{red}$ and $\epsilon_{green}$ and assuming a unitary value for either $m_{green}$ or $m_{red}$, the ideal mass ratio can be determined and used to comprise a white phosphor. The ratio can then be used to manufacture any desired amount of white phosphor.

The method can be extended to other binary combinations of precursors that satisfy the requirements set forth above, such as, for instance:

$$\epsilon_{purple}/\epsilon_{orange} = m_{orange}/m_{purple}$$

Recognizing though, that for a special situation when the same radiation source is used and the samples of precursor phosphors have the same surface area, "E" has the same value for both phosphors, a variant of the method can be devised:

$$L_{red}/L_{green} = m_{green}/m_{red}$$

The method also allows for the manufacture of white phosphors that emit light with a tint of one of the component colors. Mixtures can be comprised using mass values that deviate from the ideal ratio by, say, from 0.1% up to 10%, favoring one or another precursor, thus rendering a tint of the color emitted by the favored precursor.

This general method can be extended to a ternary mixture as well. A general example is:

$$\epsilon^{red} \cdot m_{red} = \epsilon_{blue} \cdot m_{blue} = \epsilon_{yellow} \cdot m_{yellow}$$

Although the methods of this disclosure are explained by use of phosphors that are excited by radiation in the visible or UV spectral region, one skilled in the art will recognize that the source of excitation can emit in any spectral region, e.g. X-rays, the only requirement being that the precursor phosphors are excitable by radiation with wavelength in those regions.

One skilled in the art will also recognize that this is a general method and imparts upon some blends the ability to detect some forms of radiation. For instance, if one of $P_{red}$ or $P_{green}$ is preferably excitable by X-ray incident radiation, while the other is preferably excitable by ambient UV radiation, a $P_{red}$:$P_{green}$ mixture will turn white upon exposure to X-rays.

Furthermore, the method can be adapted to be used in conjunction with other sources of excitation, say, electron beams. Assuming the intensity of the incident electron beam perceived by the precursors to be the same, and borrowing the definition of L from above, one continues to have P1 and P2 for precursor which emit in colors 1 and 2, respectively:

$$L_{color1}/L_{color2} = m_{P2}/m_{P1}$$

And, since $\epsilon$ values for e-beam excitation are reasonably known for a myriad of phosphors:

$$\epsilon_{color1}/\epsilon_{color2} = m_{P2}/m_{P1}$$

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A method of making a phosphor composition, comprising:
    providing a first phosphor compound (P1) that emits radiation in a specific color of the visible spectrum;
    providing a second phosphor compound (P2) that emits radiation in a color of the visible spectrum that is complementary to the color emitted by P1, wherein both P1 and P2 have a characteristic that they each are excited by incident radiation in the same range of wavelengths; and
    mixing the first phosphor with the second phosphor, wherein the mixing is performed by intimately combining P1 and P2 physically or chemically,
    wherein a ratio of P1:P2 is determined from $\epsilon_{P1}/\epsilon_{P2}=m_{P2}/m_{P1}$ such that the phosphor composition emits a white light wherein one of $m_{P2}$ or $m_{P1}$ is 1, wherein $\epsilon_{P1}$ denotes an efficiency of conversion of incident radiation into emitted radiation of the specific color by P1, $\epsilon_{P2}$ denotes an efficiency of conversion of incident radiation into emitted radiation of the color by P2, and $m_{P1}$ and $m_{P2}$ denote, respectively, the mass of P1 and P2 in the phosphor composition.

2. The method of claim 1, wherein $m_{P1}$ is unitary and the mass of individual P1 and P2 present in a quantity of the phosphor composition is determined by
    (a) multiplying $m_{P2}/m_{P1}$ by the value of the mass of phosphor to be manufactured to obtain the amount of P2, $m_{P2}$, needed to make the phosphor composition; and
    (b) subtracting the amount of P2, $m_{P2}$, from the total amount to be manufactured of the phosphor composition to obtain the amount of P1, $m_{P1}$.

3. The method of claim 1, further comprising a phosphor compound (P3) that emits radiation at a region of the spectrum that tints the white light a second color selected from red, green, purple, blue, and yellow, wherein the concentration of P3 is less than about 10%.

4. The method of claim 3, wherein P3 provides the white phosphorous composition with a tint in the color of radiation emitted by P3.

* * * * *